(12) United States Patent
Da Deppo et al.

(10) Patent No.: US 9,718,414 B2
(45) Date of Patent: Aug. 1, 2017

(54) HIDDEN DEVICE WITH TRANSLATING COVER

(71) Applicant: Huf North America Automotive Parts Mfg. Corp., Milwaukee, WI (US)

(72) Inventors: Lynn D. Da Deppo, Bloomfield Hills, MI (US); Ehab Kamal, Novi, MI (US); Steve Bauer, Clarkston, MI (US); Douglas Carson, West Bloomfield, MI (US); David Newkirk, West Bloomfield, MI (US)

(73) Assignee: Huf North America Automotive Parts Mfg. Corp., Milwaukee, WI (US)

( * ) Notice: Subject to any disclaimer, the term of this patent is extended or adjusted under 35 U.S.C. 154(b) by 0 days.

(21) Appl. No.: 14/145,425

(22) Filed: Dec. 31, 2013

(65) Prior Publication Data
US 2015/0183302 A1    Jul. 2, 2015

(51) Int. Cl.
    *B60R 11/04*    (2006.01)
    *B60R 11/00*    (2006.01)

(52) U.S. Cl.
    CPC ......... *B60R 11/04* (2013.01); *B60R 2011/004* (2013.01); *B60R 2011/0094* (2013.01)

(58) Field of Classification Search
    CPC ............. B60R 11/04; B60R 2011/0094; B60R 2011/0082; B60R 2011/0092;
    (Continued)

(56) References Cited

U.S. PATENT DOCUMENTS 6,524,020 B2 * 2/2003 Ellinger .................. B60R 11/04
                                                       348/148
8,305,443 B2   11/2012 Buschmann et al.
(Continued)

FOREIGN PATENT DOCUMENTS

DE    102006023103 A1    11/2007
DE    102009008281 A1    8/2010
(Continued)

OTHER PUBLICATIONS

PCT International Search Report and Written Opinion, PCT/US2014/071401, Mar. 11, 2015, 10 pages.

*Primary Examiner* — Justin Rephann
(74) *Attorney, Agent, or Firm* — Honigman Miller Schwartz and Cohn LLP; Matthew H. Szalach; Jonathan P. O'Brien (57) ABSTRACT

An assembly for deploying a device from a cavity. The assembly includes a translatable cover and a mounting surface defining an opening sized to receive the translatable cover thereover. The device is received in the cavity beneath the mounting surface and is actuatable between a first device position and a second device position. A plurality of linkages are positioned within the cavity. At least one of the plurality of linkages is coupled to a power source for actuating the plurality of linkages and at least one of the plurality of linkages is coupled to the translatable cover and to the device. Thus, when the power source actuates the plurality of linkages, the translatable cover is translated relative to the mounting surface from a first cover position to a second cover position and the device is actuated from the first device position to the second device position.

20 Claims, 4 Drawing Sheets (58) Field of Classification Search
CPC ....... B60R 2011/004; B60R 2011/0084; B60R 2011/0085
USPC ......................................................... 348/148
See application file for complete search history.

(56) References Cited

U.S. PATENT DOCUMENTS

| | | | | |
|---|---|---|---|---|
| 8,701,353 | B2* | 4/2014 | Patel | E05B 81/34 292/144 |
| 8,961,044 | B2 | 2/2015 | Barthel | |
| 2004/0130622 | A1* | 7/2004 | Lang | B60R 11/04 348/148 |
| 2009/0231430 | A1* | 9/2009 | Buschmann | B60Q 1/0023 348/148 |
| 2009/0309971 | A1* | 12/2009 | Schuetz | B60R 11/04 348/148 |
| 2010/0040361 | A1* | 2/2010 | Schuetz | B60R 11/04 396/428 |
| 2010/0245572 | A1* | 9/2010 | Son | B60R 11/04 348/148 |
| 2012/0007984 | A1* | 1/2012 | Schutz | B60R 11/04 348/148 |
| 2012/0257057 | A1 | 10/2012 | Barthel et al. | |
| 2012/0293656 | A1* | 11/2012 | Schutz | B60R 11/04 348/148 |
| 2012/0315027 | A1* | 12/2012 | Schutz | B60R 11/04 396/419 |
| 2013/0016219 | A1* | 1/2013 | Hahner | B60R 11/04 348/148 |
| 2013/0155238 | A1* | 6/2013 | Scudder | B60R 11/04 348/148 |
| 2013/0209079 | A1* | 8/2013 | Alexander | B60R 11/04 396/25 |
| 2013/0294758 | A1* | 11/2013 | Barthel | B60R 11/04 396/428 |
| 2013/0335624 | A1* | 12/2013 | Barthel | B60R 11/04 348/373 |
| 2014/0043528 | A1* | 2/2014 | Barthel | B60R 11/04 348/373 |
| 2014/0085467 | A1* | 3/2014 | Barthel | B60R 11/04 348/148 |
| 2014/0320654 | A1* | 10/2014 | Dadeppo | G02B 27/0006 348/148 |
| 2015/0258944 | A1* | 9/2015 | Buschmann | B60R 11/04 348/373 |
| 2015/0258945 | A1* | 9/2015 | Schutz | B60R 11/04 348/373 |

FOREIGN PATENT DOCUMENTS

| | | |
|---|---|---|
| DE | 102010060573 A1 | 5/2012 |
| EP | 2508393 A1 | 10/2012 |
| JP | H0721450 U | 4/1995 |

* cited by examiner

HIDDEN DEVICE WITH TRANSLATING COVER

CROSS-REFERENCE TO RELATED APPLICATION

Not applicable.

STATEMENT OF FEDERALLY SPONSORED RESEARCH OR DEVELOPMENT

Not applicable.

BACKGROUND

This disclosure relates to devices, such as cameras and sensors, used in motor vehicles. In particular, this disclosure relates to devices that are deployable with the movement of a cover using a linkage assembly.

Many motor vehicles now come equipped with some variation of a camera and sensor system to provide real-time monitoring or viewing of an area near the motor vehicle. For example, cameras, sensors, or both are often positioned on the front of the vehicle or on the rear of the motor vehicle. The cameras and sensors can detect the areas surrounding the car that are not otherwise viewable with the conventional mirrors. Such cameras and sensors can be used to assist the vehicle operator in parking or maneuvering the vehicle during normal operation, although they are certainly not limited to this specific use.

To provide a consistent field of view, many camera and sensor systems do not include a cover and are fixedly directed at the space they are intended to monitor. However, uncovered cameras and sensors are prone to dirt exposure, stone chipping and theft.

To better protect or hide the camera, sensor, or other device, some systems provide a mechanism for hiding the device within the vehicle when they are not in active use. As one conventional example, a cover may pivot on a single axis to uncover and expose the camera or sensor that is received beneath it.

While a pivoting cover may accommodate a simple uncovering of the device, in many instances the cover may cause the cover ornamentation, such as a manufacturer logo, to be obstructed from viewing in the open state and may still restrict the field of view. Accordingly, the systems that use a pivoting cover often require an additional second actuation of the device to move the device to a position in which it has an unobstructed field of view. However, achieving this certainly complicates the assembly as there are now two items that are separately driven and this frequently requires two actuators: one to actuate the cover and another to actuate the device.

Further, introducing a movable camera or sensor creates an entirely new set of potential problems as the position of a camera or sensor can be highly sensitive; that is, even small mechanical adjustments can result in significant changes in the viewing area. In assemblies with movable components, as the components are repeatedly moved from a retracted position to a deployed position and back again, the various assembly components may wear or small changes to the components such as the actuator may occur and may cause the range of motion to increase or decrease overtime. Additionally, even small vibrations or other sudden outside forces (from, for example, backing a vehicle up) might jar the camera or sensor in a way that causes the position of the camera to shift. Thus, reliably and repeatedly driving the device to a specific position that captures the desired field of view or location surrounding the vehicle is problematic in current systems. This problem is only exacerbated in systems in which multiple camera field of view amalgamation is required.

Thus, there remains a need for improved camera and sensor assemblies for vehicles.

SUMMARY OF THE INVENTION

Given the various problems outlined above related to pivoting covers to expose a device, a need exists for an improved system for deploying a device with a protective cover. In particular, there is a need for a system that can deploy the device without pivoting the protective cover to a position that interferes with the vehicle's surroundings as well as the field of view of the device.

The disclosed system overcomes the aforementioned drawbacks by providing an assembly having a device, such as a camera or sensor which is hidden from normal view from the exterior of the motor vehicle, and a cover that can be translated between an open position and a closed position to expose the device. An emblem may be provided on the cover that is continually viewable while the cover is translated between the open and closed positions. The cover is attached to a linkage system that allows the cover to be translated adjacent to the mounting surface on the vehicle while simultaneously or sequentially deploying the device into a predetermined position that provides an unobstructed field of view. Due to the structure of the linkage assembly, this movement of the cover and the device can be achieved using a single power source or actuator.

According to one aspect of the invention, an assembly for deploying a device is disclosed. The device may be, but is not limited to, a camera or a sensor. The assembly includes a translatable cover and a mounting surface that defines an opening. The opening is sized to receive the translatable cover over it. In one form, the translatable cover may be, or may be coupled to, an emblem or a vehicle logo. Further, the mounting surface may be integrally coupled to a panel, such as a fascia grill, a reinforcement panel or a closure panel of a motor vehicle. The device is received in a cavity beneath the mounting surface and is actuatable between a first device position and a second device position. A plurality of linkages are received within the cavity and couple a power source, the device, and the translatable cover to one another. One or more of the linkages is coupled to the power source for actuating the linkages. In addition, one or more of the linkages is coupled to the translatable cover and to the device. When the power source actuates the linkages, the translatable cover is translated relative to the mounting surface from a first cover position (in which the cover covers to opening) to a second cover position (in which the cover is translated away from the opening to provide a space through which the device might extend or, at least minimally, through which it may have a line of sight). Simultaneously, or sequentially, the device is actuated from the first device position (in which the device is entirely disposed within the cavity) to the second device position (in which the device might, at least in part, pass through the now uncovered opening). The translatable cover can remain substantially parallel with the mounting surface when translated from the first cover position to the second cover position and, in doing so, still proudly display any emblem or logo displayed thereon.

In one form, the linkage(s) coupled to the power source and the linkage(s) coupled to the translatable cover and to the device may be the same linkage. In another form, the linkage(s) coupled to the power source may be different from the linkage(s) coupled to the translatable cover and to the device. Thus, two or more pivot axes can be provided for the translatable cover to translate relative to the mounting surface (as opposed to pivot the cover).

The power source may rotatably actuate or translationally actuate the linkage(s) to which the power source is coupled, thereby rotatably actuating or translationally actuating the linkages. In one form, the power source may be an electric motor.

In some forms, the cavity beneath the mounting surface may be defined, at least in part, by a housing. This housing may support one or more of the device, the power source, and the plurality of linkages.

In some forms, the translatable cover may be coupled to a drive plate that includes a plurality of mounting tabs that are connected to the plurality of linkages. In one form, a first mounting tab may connect the translatable cover to one of the plurality of linkages that is pivotally connected to the housing. A second mounting tab may then connect the translatable cover to one of the plurality of linkages that is connected to both the power source and the device.

According to some forms, the opening defined by the mounting surface may provide the device with an unobstructed field view when the translatable cover is in the second cover position (that is, the open position) and the device is in the second device position (that is, an extended position in which the device has been at least moved toward, if not partially through, the opening). The opening may be sized and shaped to facilitate centering the translatable cover while the translatable cover is in the first cover position to provide a water-tight seal between the cavity and the translatable cover. In another form, a ring-like gasket sized and shaped similar to the opening may be provided for additional sealing between the cavity and the translatable cover.

The assembly may further include a restrictor member that engages the device in the second device position to reliably establish the second device position. Thus, when the device is driven to the second device position, the unobstructed field of view is substantially the same each time the device is actuated between the first device position and the second device position. In one form, the device may protrude from the opening in the second device position to obtain the unobstructed field of view. However, in other forms, the device may remain within the cavity in the second device position, while still obtaining the unobstructed field of view. Regardless of whether the device remains inside the cavity or protrudes through the opening in the second device position, the device may be pivotable about a pivotal axis between the first device position and the second device position. The pivotal axis of the device is fixed relative to the mounting surface and the plurality of linkages activates the device between the first device position and the second device position.

The device may further include a dwell mechanism that engages one of the plurality of linkages coupled to the translatable cover and to the device. The dwell mechanism is configured to stabilize the device in the second device position even when the linkages are moved due to a vibration or an external force, for example.

According to another aspect, a method for deploying a device from a cavity is disclosed. A force is applied from a power source coupled to one or more of a plurality of linkages to actuate the plurality of linkages. In one form, the force is a rotational force that is applied directly from the power source to rotatably actuate the plurality of linkages. In another form, the force is a translational force that is applied from the power source to translationally actuate the plurality of linkages. One or more of the plurality of linkages is coupled to a translatable cover and to the device such that, when the power source actuates the plurality of linkages, the translatable cover is translated relative to a mounting surface from a first cover position to a second cover position. Simultaneously, or sequentially, the device is actuated from a first device position within the cavity to a second device position using the linkages. Thus, an unobstructed opening for the device is created when the translatable cover is translated from the first cover position to the second cover position.

In one form, the linkage(s) that are coupled to the power source and the linkage(s) that are coupled to the translatable cover and to the device are the same linkage(s). In another form, the linkage(s) that are coupled to the power source are different from the linkage(s) that are coupled to the translatable cover and to the device, thereby providing two or more pivot axes for the translatable cover to translate relative to the mounting surface.

Additionally, the translatable cover and/or the plurality of linkages may incorporate a spring element, elastic member, or linkage delay that permits the power source (or the linkages) to be run or driven in some amount prior to actuation of the cover. This initial period of time in which the power source runs without encountering any mechanical resistance can help to avoid overloading of the power source in the event that significant resistance is met as might be the case, for example, if the cover and mounting surface have some ice, mud or other type of restrictive element collected thereon. Thus, by permitting the power source to have some amount of lead in or run length before encountering resistance, it is more likely to be able to overcome this resistance than if the resistance was encountered upon initial running of the power source.

These and still other advantages of the invention will be apparent from the detailed description and drawings. What follows is merely a description of a preferred embodiment of the present invention. To assess the full scope of the invention, the claims should be looked to as the preferred embodiment is not intended to be the only embodiment within the scope of the claims.

DETAILED DESCRIPTION OF THE PREFERRED EMBODIMENT

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 1:
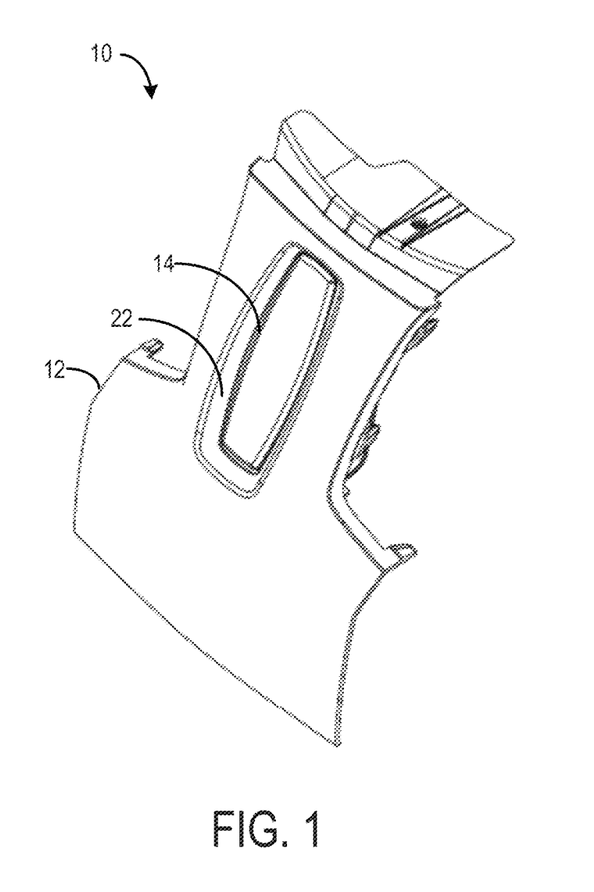
FIG. 1 is a perspective view of an assembly with a translatable cover in a closed position relative to a panel of a motor vehicle.
Figure 2:
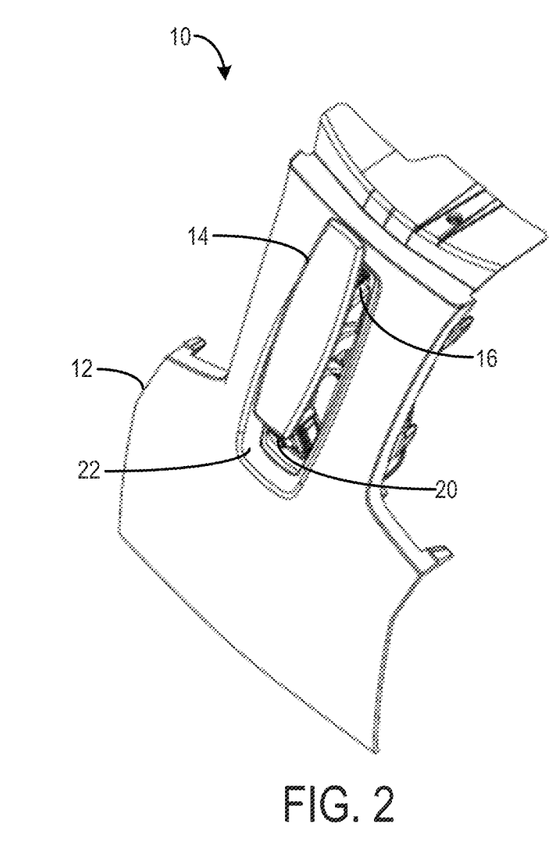
FIG. 2 is a perspective view of the assembly with the translatable cover of FIG. 1 in an open position.

Referring first to FIGS. 1 and 2, a deployment assembly 10 attached to a mounting surface 12 of a motor vehicle, for example, is shown. The mounting surface 12 may be integrally coupled to a panel, such as a fascia grill, reinforcement panel, or closure panel, of the vehicle. The deployment assembly 10 may include a cover 14 that is received by an opening 16 defined by the mounting surface 12. The cover 14 is translatable between a closed position, as shown in FIG. 1, and an open position, as shown in FIG. 2. The opening 16 may be sized and shaped similar to the cover 14 such that a water-tight seal is formed between the cover 14 and a cavity 18 beneath the mounting surface 12 when the cover 14 is in the closed position. To provide additional sealing between the cover 14 and the cavity 18, as well as centering of the cover 14 over the opening 16, a gasket 22 constructed of an elastomer, for example, may be peripherally attached to the opening 16 or the back side of the cover 14. The opening 16 is sized for a device 20, such as a camera or sensor, to obtain an unobstructed field of view of the vehicle exterior when the cover 14 is in the open position. The device 20 may protrude from the cavity 18 to obtain the unobstructed field of view or, alternatively, may remain in the cavity 18. When the cover 14 is in a closed position, as shown in FIG. 1, the device 20 is positioned within the cavity 18 and hidden from view behind the cover 14.

Still referring to FIGS. 1 and 2, the cover 14 may be, or have attached thereto, an emblem or vehicle logo. Thus, as the cover 14 is translated between the open position and closed position, the emblem or vehicle logo may be fully visible. If, for example, the cover 14 is mounted on the front of the vehicle, a close coupling to the mounting surface 12 can be maintained to insure that undesirable protrusions do not exist which could be an issue from a pedestrian protection perspective (that is, serve as an extended surface that may be bumped into or in which some might be caught during closing). The close surface relationship between the cover 14 and the mounting surface 12 also allows an aerodynamic position and potentially partial sealing for higher vehicle speed velocity performance.

Figure 3:
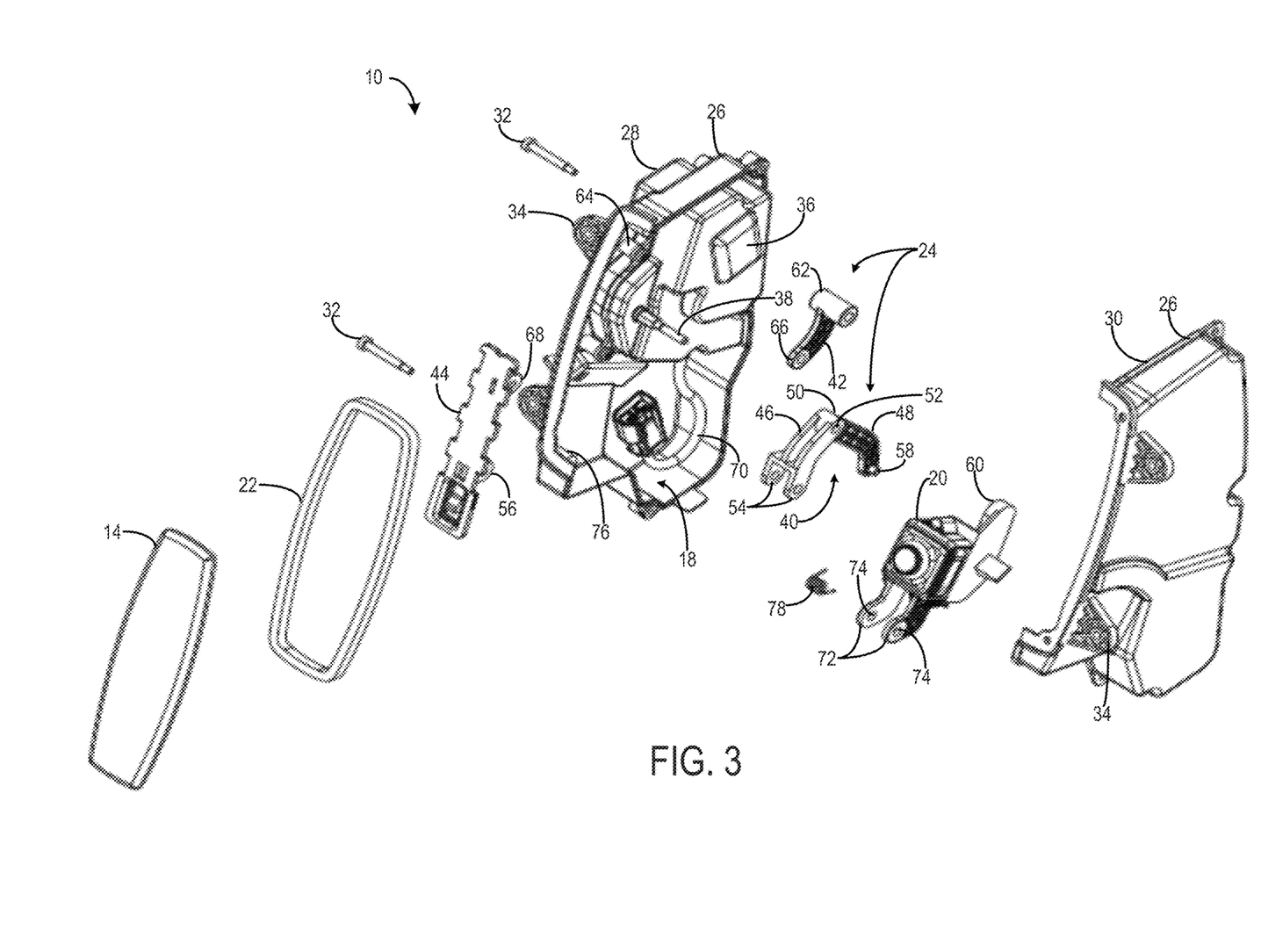
FIG. 3 is an exploded perspective view of the assembly.

The close surface relationship between the cover 14 and the mounting surface 12 can be obtained by the geometry and interconnection of a plurality of linkages 24, as will be described in further detail below, positioned within a housing 26 of the deployment assembly 10, as shown in FIG. 3. The housing 26 of the deployment assembly 10 may include a first housing cover 28 and a second housing cover 30 joined together by fasteners 32 to define the cavity 18. Both the first housing cover 28 and the second housing cover 30 may include mounting tabs 34 that are configured to receive fasteners (not shown) to couple the housing 26 to mounting surface 12 of the vehicle or to another intermediate structure.

Several components are positioned within or attached to the housing 26 including, but not limited to, a power source 36 to actuate a drive shaft 38, a first linkage 40 coupled to the drive shaft 38, a second linkage 42 coupled to the housing 26, a drive plate 44 joined to the cover 14 and coupled to the first linkage 40 and the second linkage 42, the device 20 coupled to the housing 26, and an optional controller (not shown). The power source 36 may be an electric motor, for example, coupled to a worm gear that drives a set of reduction gears to provide a rotational force to the drive shaft 38. In turn, the drive shaft 38 provides a rotational force to the first linkage 40. However, in an alternative embodiment, the drive shaft 38 might be coupled to the second linkage 42.

The first linkage 40 may be constructed of a first arcuate member 46 and a second arcuate member 48. The first arcuate member 46 and the second arcuate member 48 are joined at a connection point 50 through which a first aperture 52 axially extends, and the first aperture 52 is received by the drive shaft 38 and defines a pivotal point of the first linkage 40 relative to the housing 26. The first arcuate member 46 also includes a hinge connection 54 at an end opposite the connection point 50 that may be pivotably coupled to a first mounting tab 56 of the drive plate 44. The second arcuate member 48 includes a pin 58 at an end opposite the connection point 50 that may pivotably engage a receiving hole 60 of the device 20.

Still referring to FIG. 3, the second linkage 42 may have an arcuate shape with a cylindrical coupling 62 laterally extending from one end. The cylindrical coupling 62 may be pivotably received by a cylindrical peg 64 that laterally extends from the first housing cover 28 to define a pivotal axis of the second linkage relative to the housing 26. On an opposite end of the second linkage 42, a hinge connection 66 is provided that may be pivotably coupled to a second mounting tab 68 of the drive plate 44.

Thus, in view of the above description, the drive plate 44 (which is coupled to the surface of the cover 14) faces the cavity 18 defined in the illustrated embodiment by the housing 26. The first mounting tab 56 and the second mounting tab 68 of the drive plate 44 extend into the cavity 18 in order to attach to one of the ends of the first linkage 40 and the second linkage 42, respectively.

Accordingly, both the first linkage 40 and the second linkage 42 are separately pivotally coupled to the drive plate 44 and the housing 26. As the two rotational axes of the first and second linkages 40 and 42 are fixed relative to the housing 26, the drive plate 44 and cover 14 attached thereto establish a four-bar linkage type connection. When one of the first and second linkages 40 and 42 are driven by the power source (as illustrated, the output drive shaft 38), then the arms of the first and second linkages 40 and 42 cause a translation of the cover 14 and limit the path of motion of the cover relative to the mounting surface 12, housing 26 and cavity 18. Notably, only one of the linkages 40 and 42 need to be driven. As the other linkage is connected via the four-bar linkage type arrangement, this other linkage can be driven along its restricted range of motion to cause translation of the drive plate 44 and attached cover 14.

Thus, when the power source 36 actuates the drive shaft 38, both the first linkage 40 (which is directly driven) and the second linkage 42 (which is indirectly driven) are made to rotate simultaneously to translate the drive plate 44 and cover 14, substantially parallel to the mounting surface 12, between the closed position and the open position, as previously shown in FIGS. 1 and 2. In addition, because the first linkage 40 is also coupled to the device 20, the device 20 rotates simultaneously (or sequentially, if the linkage-device interface is set to have a time delay by virtue of the manner in which the pin 58 engages the receiving hole 60 or slot of the device 20), as the cover 14 is translated between the open and closed positions.

The device 20, as previously described, may be a camera or sensor, for example, and may be coupled to the power source 36 via a cable 70 (the device 20 may also be powered or have an electrical connection for transmission of data by alternative electrical connection).

The device 20, as shown in FIG. 3, may include arcuate-shaped arms 72 having apertures 74 axially extending therethrough. The apertures 74 are configured to be rotatably received by a cylindrical peg 76 extending laterally from the first housing cover 28. In one embodiment, a spring 78, may be positioned between the arcuate shaped arms 72 of the device 20 and received by the cylindrical peg 76 to rotationally bias the device 20.

Figure 4:
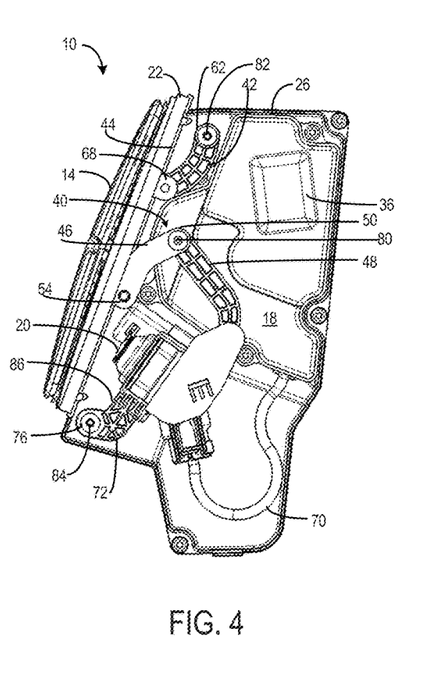
FIG. 4 is a side view of the assembly of FIG. 1 with the translatable cover in the closed position and a device in a retracted position.
Figure 5:
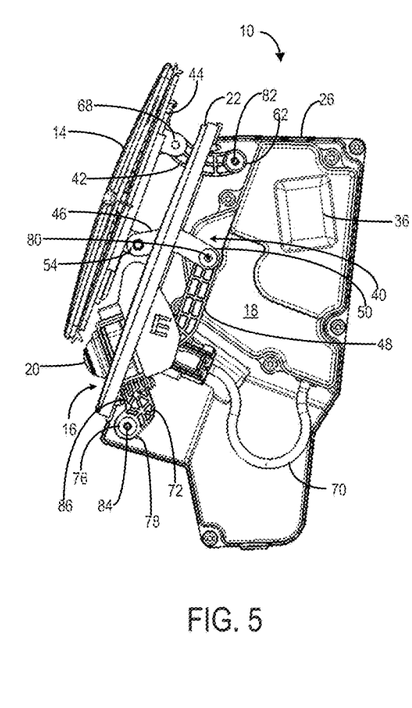
FIG. 5 is a side view of the assembly of FIG. 2 with the translatable cover in the open position and the device in a deployed position.

Referring now to FIGS. 4 and 5, during operation, the cover 14 and the device 20 may begin in a closed position and a retracted position, respectively, such that the cavity 18 is sealed and the device 20 is hidden as illustrated in FIG. 4. The power source 36 then begins to apply a force, for example a rotational force, to the drive shaft 38, thereby actuating the first linkage 40 in a clockwise direction (based on the depicted view). In one embodiment, there may be a delay from the time the power source 36 begins to rotate the drive shaft 38 or that the linkages 24 begin to actuate the cover 14. In the case of a delay between the rotation of the linkages 24 and the movement of the cover 14, this may be accomplished by providing a partially elastic cover 14 or an elastic or spring connection between the drive plate 44, the cover 14, and/or plurality of linkages 24. Thus, as the drive shaft 38 begins to rotate, the elasticity in one of the components just described inhibits the first linkage 40 from initially rotating. The time delay between the initial rotation of the drive shaft 38 and the rotation of the first linkage 40 may be advantageous if the cover 14 is stuck to the mounting surface 12 due to environmental effects, such as ice, mud or any other type of restrictive element. In addition, the elasticity in one of the components (i.e., the cover 14, drive plate 44, and/or plurality of linkages 24) may inhibit overloading the power source 36 by allowing the drive shaft 38 to build up momentum in its rotation before engaging the first linkage 40.

As a result of the rotational force applied to the drive shaft 38, the first linkage 40 begins to rotate in a clockwise direction from the perspective of FIG. 4, about a first axis 80. The rotation of the first linkage 40 causes the first arcuate member 46 to translate an outward and then upward force to the drive plate 44, which in turn causes the second linkage 42 to rotate in a clockwise direction about a second axis 82. The simultaneous rotation of the second linkage 42 similarly translates an outward and then upward movement to the drive plate 44 at second tab 68 causing the cover 14 to translate from the closed position in FIG. 4 to the open position in FIG. 5.

The clockwise rotation of the first linkage 40 simultaneously causes the second arcuate member 48 to actuate a counter-clockwise rotation of the device 20 about a third axis 84, thereby rotating the device 20 from the retracted position as shown in FIG. 4 to the deployed position in FIG. 5.

The cover 14 is translated upward, adjacent to the mounting surface 12, a sufficient amount to allow the device 20 to obtain an unobstructed field of view through the opening 16, as shown in FIG. 5. The device 20 may protrude beyond the opening 16 defined by the mounting surface 12, as shown in FIG. 5, however, the deployment assembly 10 may be configured to allow the device 20 to obtain an unobstructed field of view in the deployed position, without protruding beyond the opening 16.

It should be noted that the segments or arms of the linkages may by curved as illustrated to further extend the range of motion or to provide for clearances. For example, the linkage 42 is upwardly curved in order to avoid the upper edge of the opening 16 and to upwardly increase the range of motion for the cover 14. As another example, the segment 46 of the linkage 40 may be curved to provide clearance for the top of the device 20 as it swings into the deployed position.

In addition, the deployment assembly 10 may have a more compact cavity 18 than what is shown in FIGS. 4 and 5. A more compact cavity 18 may require greater use of sequential movement or timing elements of the cover 14 and the device 20. In other words, the cover 14 may begin to translate upward prior to the rotation of the device 20. If this sequential movement of the cover 14 and the device 20 is not performed, the device 20 might rotate from the retracted position and undesirably engage the cover 14 because the cover 14 is not able to translate upward or outward quickly enough to provide enough clearance for the device 20 to rotate. From the various embodiments described, it is conceivable that many geometries of the deployment assembly 10, especially geometries and shapes of the plurality of linkages 24, are tailorable to various cavity 18 sizes, and thus various vehicles.

Turning now to FIG. 5, once the cover 14 and the device 20 are in their respective open and deployed positions, the unobstructed field of view is obtained by the device 20. However, repeatedly positioning the device 20 to the desired deployed position may interfere with a consistent field of view area that is captured each time the device 20 is actuated from the retracted position to the deployed position. Thus, the device 20 may include a restrictor member 86 that inhibits the device 20 from rotating beyond the established deployed position so the unobstructed field of view is substantially the same each time the device 20 is actuated between the retracted position and the deployed position.

Figure 6:
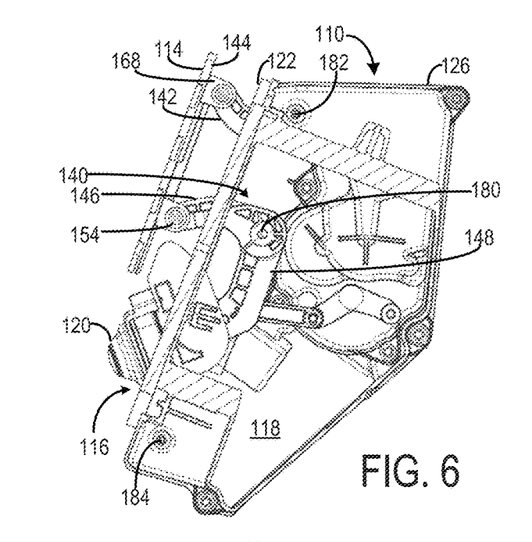
FIG. 6 is a side perspective view of the partial assembly showing a dwell area and restrictor member for the device in the deployed position.
Figure 6A:
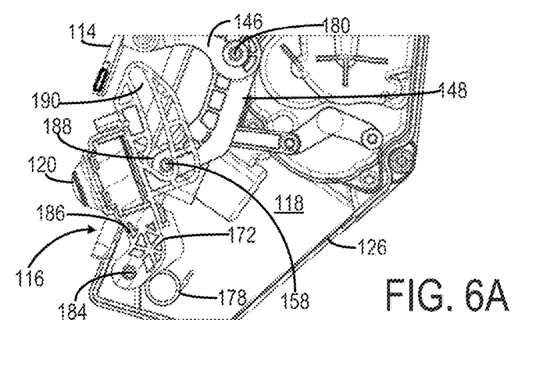
FIG. 6A is a close-up view of the dwell area and restrictor of FIG. 6
Figure 7:
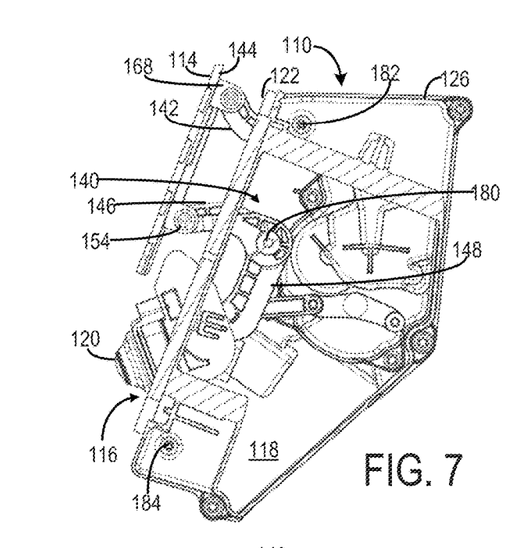
FIG. 7 is a side perspective view of the partial assembly of FIG. 6 with one of a plurality of linkages shifted and the device un-shifted in the deployed position.
Figure 7A:
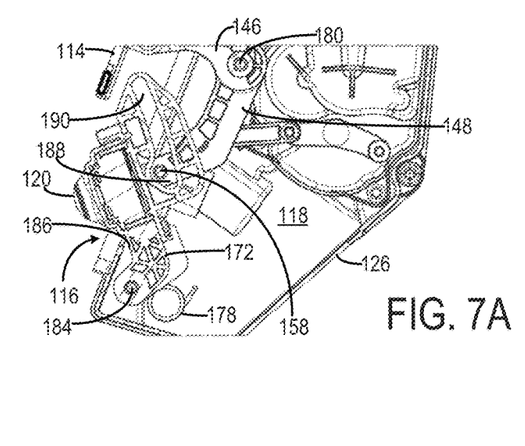
FIG. 7A is a close-up view of the dwell area and restrictor of FIG. 7

In an alternative embodiment, a deployment assembly 110, similar to the deployment assembly 10, is shown in FIGS. 6, 6A, 7 and 7A. The device 120 may include a dwell mechanism 188, which may be in the form of a slot 190 that follows a curvature of the device 120, as shown in FIGS. 6A and 7A. The pin 158 on the second arcuate member 148 of the first linkage 140 may engage the dwell mechanism 188 of the device 120. The dwell mechanism 188 ensures that the device 120 remains stable in the deployed position, even if the cover 114, the first linkage 140 or second linkage 142 is moved slightly due to an external vibration or movement, for example. As an example, FIGS. 6 and 6A show the dwell mechanism 188 in a first position with the device 120 in the deployed position. The spring 178 may rotationally bias the device 120 in the deployed position so that the restrictor member 186 engages the housing 126, but the stop inhibits the device 120 from rotating beyond the established deployed position. If overdriven, the first linkage 140 is then shifted slightly (e.g., 5 degrees), as shown by the translation of the pin 158 from a first position at the bottom of the slot 190 in FIG. 6A to a second position at a front edge of the slot 190 in FIG. 6B without further actuating the device 120. While the first linkage 140, and thus the cover 114, is moved from the position shown in FIG. 6A to the position shown in FIG. 6B, the device 120 is unmoved and remains in the deployed position, as the spring 178 maintains the device 120 against the stop of the housing while the pin 158 is driven further forward into the dwell space. Thus the same, repeatable unobstructed field of view is obtained by the device 120 each time the device 120 is in the deployed position.

At any time, the cover 14/114 and the device 20/120 may be actuated back to their respective closed and retracted positions, as shown in FIGS. 1 and 2. In one exemplary embodiment, the cover 14/114 may be axially spring loaded, for example, to the plurality of linkages 24/124, such that tolerancing associated with a hard stop of the cover 14/114 against the mounting surface 12/112 will not inhibit the plurality of linkages 24/124 from achieving their home positions, as shown in FIG. 4, for example. This may also be accomplished by providing flexibility/elasticity between the cover 14/114 and the plurality of linkages 24/124, to ensure that the cover 14/114 is recessed into the opening 16/116 of the mounting surface 12/112 with substantially equal margins on either side of the cover 14/114.

The present invention has been described in terms of one or more preferred embodiments, and it should be appreciated that many equivalents, alternatives, variations, and modifications, aside from those expressly stated, are possible and within the scope of the invention.

We claim:

1. An assembly comprising:
   a housing;
   a translatable cover;
   a mounting surface defining an opening sized to receive the translatable cover thereover;
   a device rotatably coupled to the housing, the device received in a cavity beneath the mounting surface and actuatable between a first device position and a second device position; and
   a plurality of linkages positioned within the cavity and coupled to the translatable cover, wherein at least one of the plurality of linkages is coupled to a drive shaft and at least one of the plurality of linkages is coupled to the device such that, when a power source applies a force to the drive shaft, the plurality of linkages each rotate in a first direction relative to the housing to cause the translatable cover to move in a second direction away from the opening and in a third direction along the mounting surface from a first cover position to a second cover position and the device to rotate in a fourth direction opposite to the first direction from the first device position to the second device position.

2. The assembly of claim 1, wherein the at least one of the plurality of linkages coupled to the device includes a first linkage coupled to the power source, the translatable cover, and to the device.

3. The assembly of claim 1, wherein the at least one of the plurality of linkages coupled to the drive shaft includes a first linkage coupled to the power source, and wherein the at least one of the plurality of linkages coupled to the device includes a second linkage coupled to the translatable cover and to the device, thereby providing at least two pivot axes for the translatable cover to translate relative to the mounting surface.

4. The assembly of claim 1, wherein the cavity beneath the mounting surface is defined by the housing supporting at least one of the device, the power source and the plurality of linkages.

5. The assembly of claim 1, wherein the opening provides the device with an unobstructed field of view when the translatable cover is in the second cover position and the device is in the second device position.

6. The assembly of claim 5, further comprising a restrictor member that engages the device in the second device position to establish the second device position, such that when the device is in the second device position, the unobstructed field of view is substantially the same each time the device is actuated between the first device position and the second device position.

7. The assembly of claim 1, wherein the translatable cover remains substantially parallel with the mounting surface when moved from the first cover position to the second cover position.

8. The assembly of claim 1, further comprising a drive plate coupled to the translatable cover, the drive plate including a plurality of mounting tabs connected to the plurality of linkages.

9. The assembly of claim 1, wherein the device includes a dwell mechanism that engages the at least one of the plurality of linkages coupled to the translatable cover and to the device, the dwell mechanism being configured to stabilize the device in the second device position when the plurality of linkages are moved due to at least one of a vibration and an external force.

10. The assembly of claim 1, wherein the device is at least one of a camera and a sensor.

11. The assembly of claim 1, wherein the translatable cover is at least one of an emblem and a vehicle logo.

12. The assembly of claim 1, wherein the opening is sized and shaped to facilitate centering the translatable cover while the translatable cover is in the first cover position to provide a water-tight seal between the cavity and the translatable cover.

13. The assembly of claim 1, further comprising a panel integrally coupled to the mounting surface, wherein the panel is at least one of a fascia grill, a reinforcement panel and a closure panel of a motor vehicle.

14. An assembly comprising:
   a housing;
   a translatable cover;

a mounting surface defining an opening sized to receive the translatable cover thereover;

a device rotatably coupled to the housing, the device received in a cavity beneath the mounting surface and actuatable between a first device position and a second device position; and a plurality of linkages positioned within the cavity and coupled to the translatable cover, wherein at least one of the plurality of linkages is coupled to a drive shaft and at least one of the plurality of linkages is coupled to the device such that, when a power source applies a force to the drive shaft, the plurality of linkages each rotate in a first direction relative to the housing to cause the translatable cover to translate relative to the mounting surface from a first cover position to a second cover position and the device to rotate in a second direction opposite to the first direction from the first device position to the second device position;

wherein the at least one of the plurality of linkages coupled to the drive shaft includes a first linkage coupled to the power source, and wherein the at least one of the plurality of linkages coupled to the device includes a second linkage coupled to the translatable cover and to the device, thereby providing at least two pivot axes for the translatable cover to translate relative to the mounting surface.

15. The assembly of claim 14, wherein the cavity beneath the mounting surface is defined by the housing supporting at least one of the device, the power source and the plurality of linkages.

16. The assembly of claim 14, further comprising a restrictor member that engages the device in the second device position to establish the second device position, such that when the device is in the second device position, the device has an unobstructed field of view that is substantially the same each time the device is actuated between the first device position and the second device position.

17. The assembly of claim 14, wherein the translatable cover remains substantially parallel with the mounting surface when moved from the first cover position to the second cover position.

18. The assembly of claim 14, further comprising a drive plate coupled to the translatable cover, the drive plate including a plurality of mounting tabs connected to the plurality of linkages.

19. The assembly of claim 14, wherein the device includes a dwell mechanism that engages the at least one of the plurality of linkages coupled to the translatable cover and to the device, the dwell mechanism being configured to stabilize the device in the second device position when the plurality of linkages are moved due to at least one of a vibration and an external force.

20. The assembly of claim 14, wherein the device is at least one of a camera and a sensor.

* * * * *